(12) United States Patent
Wu et al.

(10) Patent No.: US 11,008,220 B2
(45) Date of Patent: May 18, 2021

(54) PHOTOCHROMIC NANOMATERIAL CAPABLE OF BLOCKING ULTRAVIOLET RAYS, PRODUCTION METHOD AND USE THEREOF

(71) Applicant: University of Science and Technology of China, Anhui (CN)

(72) Inventors: Changzheng Wu, Anhui (CN); Bo Yang, Anhui (CN); Yi Xie, Anhui (CN)

(73) Assignee: University of Science and Technology of China, Anhui (CN)

( * ) Notice: Subject to any disclaimer, the term of this patent is extended or adjusted under 35 U.S.C. 154(b) by 0 days.

(21) Appl. No.: 16/083,801

(22) PCT Filed: Aug. 24, 2017

(86) PCT No.: PCT/CN2017/098809
§ 371 (c)(1),
(2) Date: Sep. 10, 2018

(87) PCT Pub. No.: WO2019/037021
PCT Pub. Date: Feb. 28, 2019

(65) Prior Publication Data
US 2020/0223710 A1 Jul. 16, 2020

(30) Foreign Application Priority Data

Aug. 21, 2017 (WO) ................ PCT/CN2017/098266

(51) Int. Cl.
| | | |
|---|---|---|
| C01G 29/00 | (2006.01) | |
| G02B 5/23 | (2006.01) | |
| C01G 41/02 | (2006.01) | |
| C01G 9/00 | (2006.01) | |
| B82Y 20/00 | (2011.01) | |
| B82Y 40/00 | (2011.01) | |

(52) U.S. Cl.
CPC ............ *C01G 29/00* (2013.01); *C01G 9/006* (2013.01); *C01G 41/02* (2013.01); *G02B 5/23* (2013.01); *B82Y 20/00* (2013.01); *B82Y 40/00* (2013.01); *C01P 2002/72* (2013.01); *C01P 2002/84* (2013.01); *C01P 2004/16* (2013.01); *C01P 2004/24* (2013.01); *C01P 2004/64* (2013.01); *C01P 2006/60* (2013.01); *G02B 2207/101* (2013.01)

(58) Field of Classification Search
CPC .. C01G 19/006; C01G 15/006; C01G 29/006; C01G 30/003; C01G 30/002
See application file for complete search history.

(56) References Cited

U.S. PATENT DOCUMENTS

| | | | | |
|---|---|---|---|---|
| 8,969,865 | B2 * | 3/2015 | Herman | ............ H01L 21/02628 257/43 |
| 10,118,151 | B2 * | 11/2018 | Jiang | .................... B01J 20/0259 |

FOREIGN PATENT DOCUMENTS

| | | |
|---|---|---|
| CN | 101462034 A | 6/2009 |
| CN | 103449526 A | 12/2013 |
| CN | 104071798 A | 10/2014 |
| CN | 106477633 A | 3/2017 |
| JP | 2007/154198 A | 6/2007 |
| JP | 2009/001441 A | 1/2009 |
| JP | 2012/140255 A | 7/2012 |
| JP | 2014/505146 A | 2/2014 |
| WO | WO-2007/030254 A2 | 3/2007 |

OTHER PUBLICATIONS

He et al "Crystal Hierarchically Splitting in Growth of BaWO$_4$ in Positive Cat-Anionic Microemulsion" Journal of Crystal Growth vol. 310, pp. 4581-4586, 2008.
Zhang et al "Growth of BaWO$_4$ Fishbone-Like Nanostructures in w/o Microemulsion" Journal of Colloid and Interface Science vol. 274, pp. 118-121, 2004.
Search Report issued in corresponding International Application No. PCT/CN2017/098809.
Office Action issued in corresponding Japanese Application No. 2018-548,038.

* cited by examiner

*Primary Examiner* — Stuart L Hendrickson
(74) *Attorney, Agent, or Firm* — Cesari & McKenna, LLP (57) ABSTRACT

The present disclosure provides a photochromic nanomaterial capable of blocking ultraviolet rays with a general formula of $M_aO_bX_c$, a production method and use thereof, wherein the M, O and X and a, b and c are as defined herein. The nanomaterial may be prepared by the following method: heating a mixture of an M-containing cation source compound, a polyol, a surfactant and first solvent under agitation, to obtain a hot first solution; mixing an X-containing anion source compound and a second solvent, to obtain a second solution; injecting the second solution into the hot first solution, to perform a reaction and obtain a reaction mixture; and subjecting the reaction mixture to post-treatment. The nanomaterial of the present disclosure can block 80% or more of UV rays, in particular, may change to a transparent dark color and reduce the transmittance under irradiation by strong light, whereas may restore colorless transparent state under irradiation by weak or non-strong light. Additionally, the present disclosure may have following features: a simple processing flow, low cost, high productivity, applicability in the industrial production, etc.

11 Claims, 4 Drawing Sheets

Fig. 5

# PHOTOCHROMIC NANOMATERIAL CAPABLE OF BLOCKING ULTRAVIOLET RAYS, PRODUCTION METHOD AND USE THEREOF

CROSS-REFERENCE TO RELATED APPLICATIONS

This application is the National Stage of International Application No. PCT/CN2017/098809, filed Aug. 24, 2017, which claims the benefit of International Application No. PCT/CN2017/098266, filed Aug. 21, 2017. The contents of both applications are hereby incorporated by reference in their entirety.

TECHNICAL FIELD

The present disclosure relates to the field of photochromic materials, in particular, to a photochromic nanomaterial capable of blocking ultraviolet (UV) rays, a production method and use thereof.

BACKGROUND OF THE INVENTION

Photochromism refers to the phenomenon that some compound materials undergo certain chemical reactions under irradiation by light with a certain wavelength and intensity, so as to result in a structure change of the compound and cause a color change of the compound, once the light irradiation is removed or the material is irradiated by light with another wavelength and intensity, the color restores or occurs a new change. Since Hirshberg et al reported the possibility of applying photochromism to optical record and storage in 1950s, the properties of various novel photochromic materials and the use thereof have been investigated systematically, and these materials have been used widely in the fields including window glass of buildings, lens of color-changing glasses, window glass of vehicles, information-storing materials, decorative materials, light sensitive materials, and so on.

Studies on photochromic materials are mainly focused on two major categories, i.e. organic photochromic materials and inorganic photochromic materials. However, organic photochromic materials have the problems including poor thermal stability, easily aging, weak weather resistance, and the like, which limit the practical use thereof. Inorganic photochromic materials are greatly interested due to many better properties over organic photochromic materials. So far, the studies on inorganic photochromic materials are mainly focused on transition element oxides (such as $MoO_3$, $TiO_2$, $Nb_2O_5$, $WO_3$, $Ta_2O_5$, BeO), metal halides (such as $CuCl_2$, $CdCl_2$, AgX), polyoxometalates, rare earth metal complexes, and so on. Although some material systems are relatively mature, some problems, such as relatively high cost of raw materials and complex processing techniques, limit the large-scale commercial application thereof. Meanwhile, various existing photochromic materials can reduce the transmittance of light merely, but cannot block UV rays, which have the most severe influence on human body, among the sunlight.

CN1796321 A discloses a material of $Nd_2O_3$ 0.05-1.00 mol % useful as an additive for glass, and this additive can be used to prepare photochromic glass. A document (*Physical Chemistry Chemical Physics,* 2002 (4): 1637-1639) reports production of a $WO_3$ thin film by a spin-coating method. Then Au nanoparticles are deposited on the surface of the $WO_3$ thin film by a vacuum vaporization method, so as to prepare an $Au/WO_3$ composite photochromic thin film material. A document (*Nature Materials,* 2003 (2): 29-31.) reports production of a photochromic material by depositing Ag particles on a $TiO_2$ thin film. However, these techniques and processes use expensive raw materials, such as Ag, Au, or Nb, and thus cannot meet the cost requirement in industrial production.

Additionally, a document (*Journal of Synthetic Crystals,* 2014, 43(12), 3113-3117.) reports a production method of a photochromic $WO_3$—$TiO_2$—ZnO sol. In this method, it is necessary to prepare $WO_3$, $TiO_2$ and ZnO sols respectively, and then these three sols are blended in a certain proportion to prepare the photochromic sol. In order to change the color of the photochromic sol, irradiation with a 500 W mercury lamp is needed, then 6 hours are needed to restore colorless after removing the light irradiation. The efficiency of color change is low, and the operation of the technology mentioned above is complicated. Similarly, a document (*Technical Physics Letters,* 2009, 35(10): 909-911.) reports production of a composite thin film material with a CuCl—$WO_3$ double-layered structure by using vapor deposition of $WO_3$ on a CuCl thin film. Hydrogen atoms are released by using the property of $WO_3$ that can photolyze hydrogen-atom-containing molecules, such as a water molecule. Once the hydrogen atoms become in contact with the surface of CuCl, the photochromic characteristic of CuCl is triggered. This reaction mechanism has a complex process, a low efficiency of color change, and a relatively complex production technology.

As can be seen from above, existing photochromic materials have the problems including high cost of raw materials, complex process and technology, and so on, thus cannot meet the economic efficiency requirement in industrial production, which hinder the development of photochromic materials in commercial applications. Therefore, it is urgently needed to develop an inorganic photochromic material that can block UV rays and be applied commercially in large scale, which has low cost of raw materials, relatively good thermal stability, and relatively high weathering resistance.

SUMMARY OF INVENTION

In order to solve the above-mentioned problems, the present disclosure provides following technical solutions.

In one aspect, the present disclosure provides a photochromic nanomaterial capable of blocking ultraviolet rays with a general formula of $M_aO_bX_c$, wherein M represents one or more selected from tin, indium, antimony and bismuth, or one or more selected from tin, indium, antimony and bismuth in combination with one or more selected from titanium, barium, nickel, vanadium, zinc and copper; O represents an oxygen atom; X represents one or more selected from a tungstate radical moiety, a molybdate radical moiety, a vanadate radical moiety, fluorine, chlorine, bromine and iodine that are able to form a compound with the $(M_aO_b)$ moiety in the general formula $M_aO_bX_c$, or one or more selected from a tungstate radical moiety, a molybdate radical moiety, a vanadate radical moiety, fluorine, chlorine, bromine and iodine that are able to form a compound with the $(M_aO_b)$ moiety in the general formula $M_aO_bX_c$ in combination with one or more selected from sulfur, carbon, phosphorus and boron, and wherein in the general formula $M_aO_bX_c$, the molar ratio a:b:c of each constructional moiety is (1~50):(1~50):1.

In a preferred embodiment, in the general formula $M_aO_bX_c$, the molar ratio a:b:c of each constructional moiety is (1~20):(1~30):1.

In a preferred embodiment, the morphology of the nanomaterial comprises one or more selected from quantum dots, nanowires, nanosheets, nanobelts and nanoparticles.

In another aspect, the present disclosure provides a method for producing a photochromic nanomaterial capable of blocking ultraviolet rays with a general formula of $M_aO_bX_c$, wherein M represents one or more selected from tin, indium, antimony and bismuth, or one or more selected from tin, indium, antimony and bismuth in combination with one or more selected from titanium, barium, nickel, vanadium, zinc and copper; O represents an oxygen atom; X represents one or more selected from a tungstate radical moiety, a molybdate radical moiety, a vanadate radical moiety, fluorine, chlorine, bromine and iodine that are able to form a compound with the $(M_aO_b)$ moiety in the general formula $M_aO_bX_c$, or one or more selected from a tungstate radical moiety, a molybdate radical moiety, a vanadate radical moiety, fluorine, chlorine, bromine and iodine that are able to form a compound with the $(M_aO_b)$ moiety in the general formula $M_aO_bX_c$ in combination with one or more selected from sulfur, carbon, phosphorus and boron, and wherein in the general formula $M_aO_bX_c$, the molar ratio a:b:c of each constructional moiety is (1~50):(1~50):1, wherein the method comprises following steps:

A) heating a mixture of an M-containing cation source compound, a polyol, a surfactant and a first solvent under agitation to obtain a hot first solution;

B) mixing an X-containing anion source compound and a second solvent to obtain a second solution;

C) injecting the second solution into the hot first solution to perform a reaction and obtain a reaction mixture;

D) subjecting the reaction mixture to cooling, separation, washing and/or drying to obtain the photochromic nanomaterial.

In a preferred embodiment, the polyol is one or more selected from oleyl alcohol, glycerol, pentaerythritol, xylitol, mannitol, and sorbitol.

In a preferred embodiment, the surfactant is one or more selected from sodium dodecyl benzene sulfonate, cetyl trimethylammonium bromide, disodium edetate, polyvinyl pyrrolidone, lauroyl glutamic acid, sodium stearyl sulfate, and fatty alcohol-polyoxyethylene ether sulfate sodium.

In a preferred embodiment, the first solvent and the second solvent are, independently to each other, one or more selected from $C_{1-6}$ alkanol, deionized water, oleyl amine, cyclohexane, and oleic acid.

In a preferred embodiment, the polyol and the M-containing cation source compound have a mass ratio of (1~1500):15.

In a preferred embodiment, the surfactant and the M-containing cation source compound have a mass ratio of (1~2000):20.

In a preferred embodiment, the first solvent and the M-containing cation source compound have a mass ratio of (1~2000):10.

In a preferred embodiment, the second solvent and the X-containing anion source compound have a mass ratio of (1~1500):10.

In a preferred embodiment, the hot first solution has a temperature between 30° C. and 300° C.

In a preferred embodiment, the time period for injecting the second solution into the hot first solution is from 1 s to 12 h.

In a preferred embodiment, the separation is centrifugal separation.

In a preferred embodiment, the drying is freeze drying or heat drying performed at a temperature between −50° C. and 150° C. for a period between 1 h to 72 h.

In still another aspect, the present disclosure provides use of the above-mentioned photochromic nanomaterial or the photochromic nanomaterial prepared by the above-mentioned method in window glass of buildings, lens of color-changing glasses, window glass of vehicles, information-storing materials, decorative materials, or light sensitive materials.

The present disclosure provides a photochromic nanomaterial, which can block UV rays with low cost, and the materials doped with the photochromic nanomaterial. The nanomaterial with the general formula $M_aO_bX_c$ and the smart window glass made of the materials doped with this nanomaterial in the present disclosure may block 80% or more of UV rays, in particular, may change to a transparent dark color and reduce the transmittance when being irradiated by strong light, whereas they may restore colorless transparent state when being irradiated by weak light or non-strong light. Additionally, the photochromic nanomaterial of the present disclosure is also useful in lens of color-changing glasses, window glass of vehicles, information-storing materials, decorative materials, light sensitive materials, and so on.

DETAILED DESCRIPTION OF EMBODIMENTS

The present disclosure provides a photochromic nanomaterial capable of blocking ultraviolet rays with a general formula of $M_aO_bX_c$, wherein M represents one or more selected from tin, indium, antimony and bismuth, or one or more selected from tin, indium, antimony and bismuth in combination with one or more selected from titanium, barium, nickel, vanadium, zinc and copper; O represents an oxygen atom; X represents one or more selected from a tungstate radical moiety, a molybdate radical moiety, a vanadate radical moiety, fluorine, chlorine, bromine and iodine that are able to form a compound with the $(M_aO_b)$ moiety in the general formula $M_aO_bX_c$, or one or more selected from a tungstate radical moiety, a molybdate radical moiety, a vanadate radical moiety, fluorine, chlorine, bromine and iodine that are able to form a compound with the $(M_aO_b)$ moiety in the general formula $M_aO_bX_c$ in combination with one or more selected from sulfur, carbon, phosphorus and boron, and wherein in the general formula $M_aO_bX_c$, the molar ratio a:b:c of each constructional moiety is (1~50):(1~50):1.

The present disclosure also provides a method for producing a photochromic nanomaterial capable of blocking ultraviolet rays with a general formula of $M_aO_bX_c$, wherein M represents one or more selected from tin, indium, antimony and bismuth, or one or more selected from tin, indium, antimony and bismuth in combination with one or more selected from titanium, barium, nickel, vanadium, zinc and copper; O represents an oxygen atom; X represents one or more selected from a tungstate radical moiety, a molybdate radical moiety, a vanadate radical moiety, fluorine, chlorine, bromine and iodine that are able to form a compound with the ($M_aO_b$) moiety in the general formula $M_aO_bX_c$, or one or more selected from a tungstate radical moiety, a molybdate radical moiety, a vanadate radical moiety, fluorine, chlorine, bromine and iodine that are able to form a compound with the ($M_aO_b$) moiety in the general formula $M_aO_bX_c$ in combination with one or more selected from sulfur, carbon, phosphorus and boron, and wherein in the general formula $M_aO_bX_c$, the molar ratio a:b:c of each constructional moiety is (1~50):(1~50):1, wherein the method comprises following steps:

A) heating a mixture of an M-containing cation source compound, a polyol, a surfactant and a first solvent under agitation, to obtain a hot first solution;

B) mixing an X-containing anion source compound and a second solvent to obtain a second solution;

C) injecting the second solution into the hot first solution to perform a reaction and obtain a reaction mixture;

D) subjecting the reaction mixture to cooling, separation, washing and/or drying to obtain the photochromic nanomaterial.

As used herein, the expression "M represents one or more selected from tin, indium, antimony and bismuth, or one or more selected from tin, indium, antimony and bismuth in combination with one or more selected from titanium, barium, nickel, vanadium, zinc and copper" means that M may be merely one or more selected from tin, indium, antimony and bismuth, or M may also be a cation source combination of one or more selected from tin, indium, antimony and bismuth and one or more selected from titanium, barium, nickel, vanadium, zinc and copper. In the case that M is the cation source combination, the molar coefficient a is the sum of the mole numbers of all atoms in this cation source combination.

As used herein, the expression "X represents one or more selected from a tungstate radical moiety, a molybdate radical moiety, a vanadate radical moiety, fluorine, chlorine, bromine and iodine that are able to form a compound with the ($M_aO_b$) moiety in the general formula $M_aO_bX_c$, or one or more selected from a tungstate radical moiety, a molybdate radical moiety, a vanadate radical moiety, fluorine, chlorine, bromine and iodine that are able to form a compound with the ($M_aO_b$) moiety in the general formula $M_aO_bX_c$ in combination with one or more selected from sulfur, carbon, phosphorus and boron, and wherein in the general formula $M_aO_bX_c$" means that X may be merely one or more selected from a tungstate radical moiety, a molybdate radical moiety, a vanadate radical moiety, fluorine, chlorine, bromine and iodine, or X may also be an anion source combination of one or more selected from a tungstate radical moiety, a molybdate radical moiety, a vanadate radical moiety, fluorine, chlorine, bromine and iodine and one of more selected from sulfur, carbon, phosphorus and boron. Here, the applicant would like to explain that in the case that X is a tungstate radical moiety, a molybdate radical moiety, or a vanadate radical moiety, such moiety is a separate unit or atom group, and the metal atom and O atom contained in this moiety belong to the X in the general formula, rather than belong to the M and O in the general formula $M_aO_bX_c$ respectively. In the case that X is the anion source combination, the molar coefficient c is the sum of the mole numbers of all moieties in this cation source combination.

The M-containing cation source compound is preferably a tin, bismuth, antimony and indium compound, more preferably a trivalent compound, a tetravalent compound or a pentavalent compound of the above-mentioned metals, more preferably a soluble trivalent compound, a soluble tetravalent compound or a soluble pentavalent compound of the above-mentioned metals, and specifically it may be, for example, tin/bismuth/antimony/indium chloride, tin/bismuth/antimony/indium acetate, tin/bismuth/antimonyl/indium nitrate, tin/bismuth/antimony/indium citrate, or the like.

In the present disclosure, the polyol is not specifically limited, and may be any general polyol well known by those skilled in the art. Those skilled in the art may perform selection and adjustment according to practical production conditions, raw material conditions and product requirements. In the present disclosure, the polyol is preferably one or more selected from pentaerythritol, neopentylene glycol, cinnamic alcohol, trihydroxymethyl ethane, glycerol, xylitol, oleyl alcohol, mannitol and sorbitol, more preferably one or more selected from oleyl alcohol, glycerol, pentaerythritol, xylitol, mannitol and sorbitol, and most preferably one or more selected from oleyl alcohol, glycerol, xylitol and mannitol.

In the present disclosure, the surfactant is not specifically limited, and may be any general surfactant well known by those skilled in the art. Those skilled in the art may perform selection and adjustment according to practical production conditions, raw material conditions and product requirements. In the present disclosure, the surfactant is preferably one or more selected from lignosulfonate, sodium dodecyl benzene sulfonate, cetyl trimethylammonium bromide, heavy alkylbezene sulfonate, alkyl sulfonate, disodium edetate, polyvinyl pyrrolidone, lauroyl glutamic acid, sodium stearyl sulfate and fatty alcohol-polyoxyethylene ether sulfate sodium, more preferably one or more selected from sodium dodecyl benzene sulfonate, cetyl trimethylammonium bromide, disodium edetate, polyvinyl pyrrolidone, lauroyl glutamic acid, sodium stearyl sulfate and fatty alcohol-polyoxyethylene ether sulfate sodium, and most preferably one or more selected from cetyl trimethylammonium bromide, disodium edetate, polyvinyl pyrrolidone and sodium dodecyl benzene sulfonate.

In the present disclosure, the amount of the surfactant is not specifically limited, and may be any general amount of the surfactant well known by those skilled in the art. Those skilled in the art may perform selection and adjustment according to practical production conditions, raw material conditions and product requirements. The mass ratio of the surfactant to the M-containing cation source compound is preferably (1~2000):20, more preferably (1~1000):20, more preferably (1~500):20, and most preferably (1~150):20.

The first and second solvents may be independently one or more selected from alcohols, n-pentane, deionized water, acetone, oleyl amine, octadecene, cyclohexane and oleic acid, more preferably one or more selected from alcohols, deionized water, oleyl amine, oleic acid, cyclohexane and octadecene, and most preferably one or more selected from alcohols, deionized water, oleyl amine, oleic acid and octadecene.

The mass ratio of the first solvent to the M-containing cation source compound is preferably (1~2000):10, more preferably (1~1800):10, and most preferably (1~1200):10.

The anion source compound comprises preferably one or more selected from a tungstate, molybdate, or vanadate of sodium, potassium and ammonium; trisodium phosphate chloride; vanadium chloride; a halide of sodium, potassium, manganese, barium, copper, magnesium and ammonium, such as potassium fluoride, potassium chloride, etc., more preferably one or more selected from potassium tungstate, potassium molybdate, potassium vanadate, sodium tungstate, sodium molybdate, sodium vanadate, ammonium tungstate, ammonium molybdate, ammonium vanadate, trisodium phosphate chloride, vanadium chloride, potassium fluoride, potassium chloride, potassium bromide, potassium iodide, sodium fluoride, sodium chloride, sodium bromide, sodium iodide, ammonium fluoride, ammonium chloride, ammonium bromide and ammonium iodide, and most preferably one or more selected from tungstate, potassium molybdate, potassium vanadate, sodium tungstate, sodium molybdate, sodium vanadate, ammonium tungstate, ammonium molybdate, ammonium vanadate, trisodium phosphate chloride, vanadium chloride, potassium chloride, potassium bromide, potassium iodide, sodium chloride, sodium bromide, sodium iodide, ammonium chloride, ammonium bromide and ammonium iodide.

The mass ratio of the second solvent to the anion source compound is preferably (1~1500):10, more preferably (1~1300):10, and most preferably (1~1000):10.

In order to ensure the progress of the reaction, the heating temperature of the first solution is preferably 30° C. to 500° C., more preferably 30° C. to 300° C., and most preferably 80° C. to 200° C.

The period of time for injecting the second solution into the hot first solution is preferably 1 s to 12 h, more preferably is to 6 h, and most preferably 1 s to 2 h. The cooling time is preferably 1 min to 180 min, more preferably 1 min to 60 min, and most preferably 1 min to 30 min.

The cooling temperature is preferably −50° C. to 50° C., more preferably −20° C. to 20° C., and most preferably −10° C. to 10° C.

In the present disclosure, the drying temperature is not specifically limited, and may be any drying temperature well known by those skilled in the art. Those skilled in the art may perform selection and adjustment according to practical production conditions, raw material conditions and product requirements. The drying may be, for example, freeze drying or heat drying, and the drying temperature is preferably −50° C. to 150° C., more preferably −50° C. to 120° C., and most preferably −50° C. to 60° C.

In the present disclosure, the drying time is not specifically limited, and may be any general drying time well known by those skilled in the art. Those skilled in the art may perform selection and adjustment according to practical production conditions, raw material conditions and product requirements. The drying time is preferably 1 h to 72 h, more preferably 1 h to 60 h, and most preferably 8 h to 24 h.

In the present disclosure, the proportion of the elements in the general formula $M_aO_bX_c$ is preferably a:b:c=(1~20):(1~30):1.

The above-mentioned photochromic nanomaterial of the present disclosure may be used in the fields of window glass of buildings, lens of color-changing glasses, window glass of vehicles, information-storing materials, decorative materials, light sensitive materials, and so on.

EXAMPLES

In order to further explain the present disclosure, inorganic photochromic materials and production methods thereof provided in the present disclosure are described in details in combination with Examples. However, it should be understood that these Examples were performed according to the technical solutions of the present disclosure. The embodiments in details and specific operation processes given are only for further explaining the characteristics and advantages of the present disclosure, but not limiting claims of the present disclosure. The protection scope of the present disclosure is not limited to the Examples below, either. Meanwhile, without additional indication, all raw materials, reagents and devices mentioned in the specification of the present application may be available from the market and used directly as it is.

Example 1: Preparation of $Bi_5O_7I$ Nanomaterial 0.5 g bismuth nitrate was weighed out and added into a 50 mL three-necked flask filled with 30 mL deionized water. The mixture was then stirred for 5 min by a magnetic stirrer. 0.6 g mannitol was weighed out and added into the above mixed solution, and then the solution was heated to 100° C. by an electric heating jacket. 1 g polyvinyl pyrrolidone was weighed out and added into the above mixed solution, and then the solution was heated and stirred for another 30 min, until the solution was in a transparent state, so as to obtain a first solution.

0.1 g sodium iodide was weighed out and added into a 25 mL beaker filled with 10 mL deionized water. The mixture was then stirred for 15 min by a magnetic stirrer equipped with an electric heating jacket, until the solution was in a transparent state, so as to obtain a second solution.

The second solution was injected into the first solution by a syringe. After the reaction system was reacted for 100 s in the above-mentioned three-necked flask stirred by the magnetic stirrer and heated by an electric heating jacket, it was cooled to the room temperature in ice-bath.

Once the reaction was completed, the product was washed 3 to 5 times circularly with absolute ethyl alcohol and deionized water in a centrifugal manner (the high speed centrifuge was available from Zonkia, centrifugal speed: 1400 rpm, centrifugal time: 5 min/cycle). Finally, the sample was dried in a drying oven at a constant temperature of 60° C.

Figure 1:
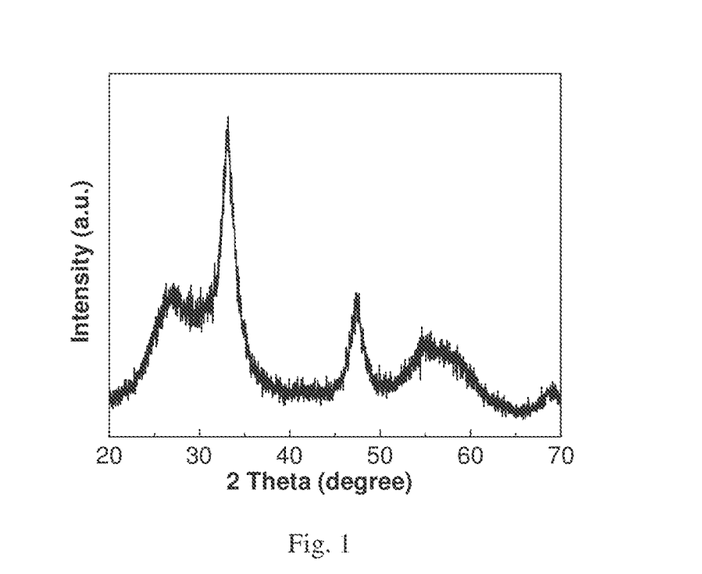
FIG. 1 is an X-ray diffraction diagram of the $Bi_5O_7I$ nanomaterial prepared according to Example 1 of the present disclosure.

The obtained sample was examined by an X-ray diffractometer (device model: Philips X' Pert PRO SUPER). The X-ray diffraction diagram as FIG. 1 was obtained, and thereby the sample was identified to be $Bi_5O_7I$. As can be seen from FIG. 1, there are no other peaks of impurities, indicating that the $Bi_5O_7I$ nanomaterial prepared in the Example 1 has relatively high purity.

Figure 2:
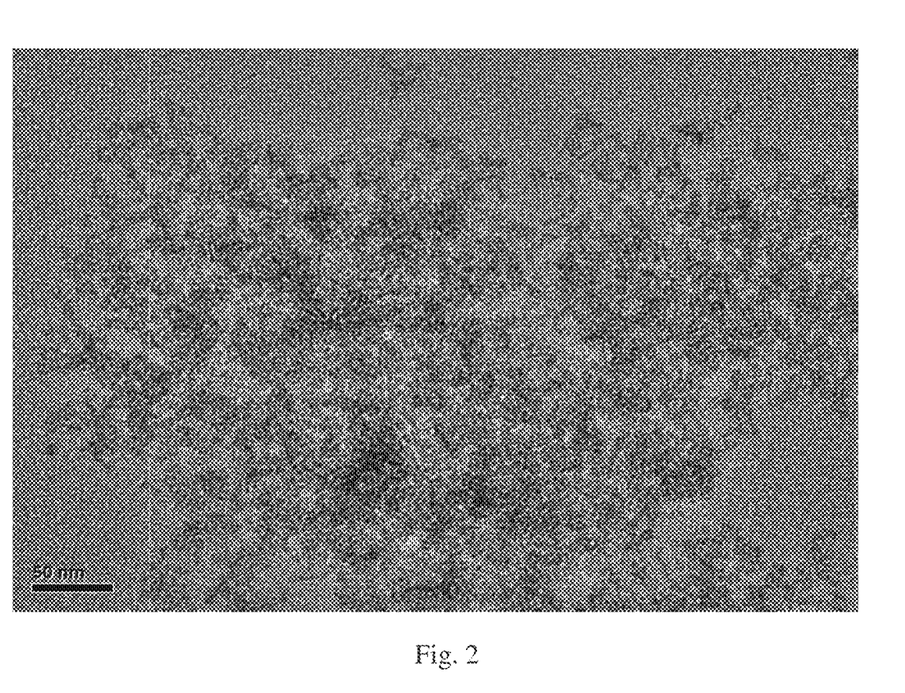
FIG. 2 is an image of transmission electron microscopy of the $Bi_5O_7I$ nanomaterial prepared according to Example 1 of the present disclosure.

The obtained sample was examined by a transmission electron microscope (device model: JEM-2100F). The image of transmission electron microscopy as FIG. 2 was obtained. As can be seen from FIG. 2, the morphology of the $Bi_5O_7I$ nanomaterial prepared in the Example 1 is quantum dots below 10 nm with a uniform size.

Figure 3:
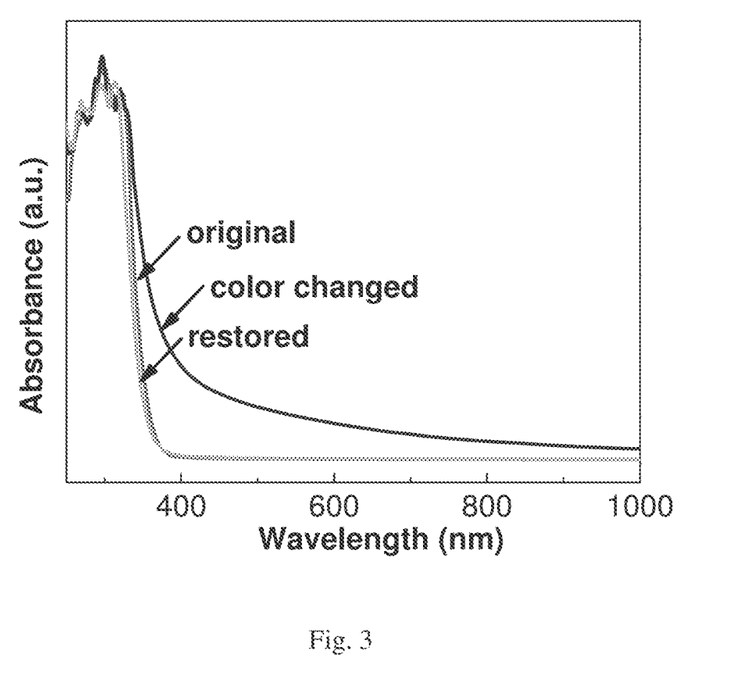
FIG. 3 is a UV-Vis-near IR absorption spectra of the $Bi_5O_7I$ nanomaterial prepared according to Example 1 of the present disclosure in the original state, in the color changed state after light irradiation and in the restored state after light irradiation is not applied.

The sample was examined by a deep UV-VIS-near IR spectrophotometer (model: DUV-3700). UV-VIS-near IR absorption spectra as FIG. 3 were obtained. As can be seen from FIG. 3, the $Bi_5O_7I$ nanomaterial prepared in the Example 1 may block 80% or more of UV rays in the original state, in the photochromic color-changed state and in the restoring state. Meanwhile, in the photochromic color-changed state, it may block a part of visible light, so as to reduce the light intensity.

Example 2: Preparation of InOI Nanomaterial 0.65 g indium chloride was weighed out and added into a 50 mL three-necked flask filled with 30 mL deionized water. The mixture was then stirred for 5 min by a magnetic stirrer. 1 g xylitol was weighed out and added into the above mixed solution, and then the solution was heated to 100° C. by an electric heating jacket. 1 g disodium edetate was weighed out and added into the above mixed solution, and then the solution was heated and stirred for another 30 min, until the solution was in a transparent state, so as to obtain a first solution.

0.5 g sodium iodide was weighed out and added into a 25 mL beaker filled with 15 mL deionized water. The mixture was then stirred for 15 min by a magnetic stirrer equipped with an electric heating jacket, until the solution was in a transparent state, so as to obtain a second solution.

The second solution was injected into the first solution by a syringe. After the reaction system was reacted for 150 s in the above-mentioned three-necked flask stirred by the magnetic stirrer and heated by an electric heating jacket, it was cooled to the room temperature in ice-bath.

Once the reaction was completed, the product was washed 3 to 5 times circularly with absolute ethyl alcohol and deionized water in a centrifugal manner (the high speed centrifuge was available from Zonkia, centrifugal speed: 14000 rpm, centrifugal time: 5 min/cycle). Finally, the sample was dried in a drying oven at a constant temperature of 60° C.

The obtained sample was subjected to the same identification, examination and analysis as in the above-mentioned Example 1. It was confirmed that the obtained sample is InOI nanoparticles with a uniform size. They may block 80% or more of UV rays in the original state, in the photochromic color-changed state and in the restoring state. Meanwhile, in the photochromic color-changed state, they may block a part of visible light, so as to reduce the light intensity.

Example 3: Preparation of $Bi_9V_2O_{18}Cl$ Nanomaterial 0.85 g bismuth nitrate was weighed out and added into a 50 mL three-necked flask filled with 30 mL octadecene. The mixture was then stirred for 5 min by a magnetic stirrer. 0.5 g oleyl alcohol was weighed out and added into the above mixed solution, and then the solution was heated to 100° C. by an electric heating jacket. 0.5 g cetyl trimethylammonium bromide was weighed out and added into the above mixed solution, and then the solution was heated and stirred for another 30 min, until the solution was in a transparent state, so as to obtain a first solution.

0.1 g vanadium chloride was weighed out and added into a 10 mL beaker filled with 5 mL oleyl amine. The mixture was then stirred for 25 min by a magnetic stirrer equipped with an electric heating jacket, until the solution was in a transparent state, so as to obtain a second solution.

The second solution was injected into the first solution by a syringe. After the reaction system was reacted for 60 s in the above-mentioned three-necked flask stirred by the magnetic stirrer and heated by an electric heating jacket, it was cooled to the room temperature in ice-bath.

Once the reaction was completed, the product was washed 3 to 5 times circularly with absolute ethyl alcohol and deionized water in a centrifugal manner (the high speed centrifuge was available from Zonkia, centrifugal speed: 14000 rpm, centrifugal time: 5 mil/cycle). Finally, the sample was dried in a freeze drying oven (available from Shanghai Bilon) at a constant temperature of −50° C.

The obtained sample was subjected to the same identification, examination and analysis as in the above-mentioned Example 1. It was confirmed that the obtained sample is $Bi_9V_2O_{18}Cl$ nanowires with a uniform size. They may block 80% or more of UV rays in the original state, in the photochromic color-changed state and in the restoring state. Meanwhile, in the photochromic color-changed state, they may block a part of visible light, so as to reduce the light intensity.

Example 4: Preparation of $BiBaO_2Br$ Nanomaterial 0.5 g bismuth nitrate was weighed out and added into a 50 mL three-necked flask filled with 30 mL deionized water. The mixture was then stirred for 5 min by a magnetic stirrer. 1 g mannitol was weighed out and added into the above mixed solution, and then the solution was heated to 100° C. by an electric heating jacket. 0.6 g barium acetate was weighted and added into the above mixed solution, heated and stirred for another 10 min. 1 g disodium edetate was weighed out and added into the above mixed solution, and then the solution was heated and stirred for another 30 min, until the solution was in a transparent state, so as to obtain a first solution.

0.45 g sodium bromide was weighed out and added into a 25 mL beaker filled with 10 mL deionized water. The mixture was then stirred for 15 min by a magnetic stirrer equipped with an electric heating jacket, until the solution was in a transparent state, so as to obtain a second solution.

The second solution was injected into the first solution by a syringe. After the reaction system was reacted for 240 s in the above-mentioned three-necked flask stirred by the magnetic stirrer and heated by an electric heating jacket, it was cooled to the room temperature in ice-bath.

Once the reaction was completed, the product was washed 3 to 5 times circularly with absolute ethyl alcohol and deionized water in a centrifugal manner (the high speed centrifuge was available from Zonkia, centrifugal speed: 14000 rpm, centrifugal time: 5 min/cycle). Finally, the sample was dried in a freeze drying oven (available from Shanghai Bilon) at a constant temperature of −50° C.

The obtained sample was subjected to the same identification, examination and analysis as in the above-mentioned Example 1. It was confirmed that the obtained sample is $BiBaO_2Br$ nanosheets with a uniform size. They may block 80% or more of UV rays in the original state, in the photochromic color-changed state and in the restoring state. Meanwhile, in the photochromic color-changed state, they may block a part of visible light, so as to reduce the light intensity.

Example 5: Preparation of $Sb_4O_5Cl_2$ Nanomaterial 0.8 g antimony chloride was weighed out and added into a 50 mL three-necked flask filled with 30 mL deionized water. The mixture was then stirred for 5 min by a magnetic stirrer. 0.5 g xylitol was weighed out and added into the above mixed solution, and then the solution was heated to 150° C. by an electric heating jacket. 1 g polyvinyl pyrrolidone was weighed out and added into the above mixed solution, and then the solution was heated and stirred for another 15 min, until the solution was in a transparent state, so as to obtain a first solution.

0.2 g sodium chloride was weighed out and added into a 10 mL beaker filled with 3 mL oleyl amine. The mixture was then stirred for 25 min by a magnetic stirrer equipped with an electric heating jacket, until the solution was in a transparent state, so as to obtain a second solution.

The second solution was injected into the first solution by a syringe. After the reaction system was reacted for 80 s in the above-mentioned three-necked flask stirred by the magnetic stirrer and heated by an electric heating jacket, it was cooled to the room temperature in ice-bath.

Once the reaction was completed, the product was washed 3 to 5 times circularly with absolute ethyl alcohol and cyclohexane in a centrifugal manner (the high speed centrifuge was available from Zonkia, centrifugal speed: 14000 rpm, centrifugal time: 5 min/cycle). Finally, the sample was dried in a freeze drying oven (available from Shanghai Bilon) at a constant temperature of −50° C.

The obtained sample was subjected to the same identification, examination and analysis as in the above-mentioned Example 1. It was confirmed that the obtained sample is $Sb_4O_5Cl_2$ quantum dot nanomaterial with a uniform size. They may block 80% or more of UV rays in the original state, in the photochromic color-changed state and in the restoring state. Meanwhile, in the photochromic color-changed state, they may block a part of visible light, so as to reduce the light intensity.

Example 6: Preparation of $Bi_9O_{18}P_2Cl$ Nanomaterial 0.5 g bismuth nitrate was weighed out and added into a 50 mL three-necked flask filled with 30 mL octadecene. The mixture was then stirred for 5 min by a magnetic stirrer. 0.5 g oleyl alcohol was weighed out and added into the above mixed solution, and then the solution was heated to 150° C. by an electric heating jacket. 0.4 g polyvinyl pyrrolidone was weighed out and added into the above mixed solution, and then the solution was heated and stirred for another 15 min, until the solution was in a transparent state, so as to obtain a first solution.

0.15 g trisodium phosphate chloride was weighed out and added into a 10 mL beaker filled with 3 mL oleyl amine. The mixture was then stirred for 20 min by a magnetic stirrer equipped with an electric heating jacket, until the solution was in a transparent state, so as to obtain a second solution.

The second solution was injected into the first solution by a syringe. After the reaction system was reacted for 180 s in the above-mentioned three-necked flask stirred by the magnetic stirrer and heated by an electric heating jacket, it was cooled to the room temperature in ice-bath.

Once the reaction was completed, the product was washed 3 to 5 times circularly with absolute ethyl alcohol and cyclohexane in a centrifugal manner (the high speed centrifuge was available from Zonkia, centrifugal speed: 14000 rpm, centrifugal time: 5 min/cycle). Finally, the sample was dried in a drying oven at a constant temperature of 60° C.

The obtained sample was subjected to the same identification, examination and analysis as in the above-mentioned Example 1. It was confirmed that the obtained sample is $Bi_9O_{18}P_2Cl$ nanosheets with a uniform size. They may block 80% or more of UV rays in the original state, in the photochromic color-changed state and in the restoring state. Meanwhile, in the photochromic color-changed state, they may block a part of visible light, so as to reduce the light intensity.

Example 7: Preparation of $Sb_8O_{11}Br_2$ Nanomaterial 0.5 g antimony acetate was weighed out and added into a 50 mL three-necked flask filled with 30 mL ethylene glycol, which was then stirred for 5 min by a magnetic stirrer. 0.5 g glycerol was weighed out and added into the above mixed solution, and then the solution was heated to 150° C. by an electric heating jacket. 0.8 g cetyl trimethylammonium bromide was weighed out and added into the above mixed solution, and then the solution was heated and stirred for another 15 min. until the solution was in a transparent state, so as to obtain a first solution.

0.2 g sodium bromide was weighed out and added into a 10 mL beaker filled with 5 mL ethylene glycol. The mixture was then stirred for 15 min by a magnetic stirrer equipped with an electric heating jacket, until the solution was in a transparent state, so as to obtain a second solution.

The second solution was injected into the first solution by a syringe. After the reaction system was reacted for 200 s in the above-mentioned three-necked flask stirred by the magnetic stirrer and heated by an electric heating jacket, it was cooled to the room temperature in ice-bath.

Once the reaction was completed, the product was washed 3 to 5 times circularly with absolute ethyl alcohol and deionized water in a centrifugal manner (the high speed centrifuge was available from Zonkia, centrifugal speed: 14000 rpm, centrifugal time: 5 min/cycle). Finally, the sample was dried in a drying oven at a constant temperature of 60° C.

The obtained sample was subjected to the same identification, examination and analysis as in the above-mentioned Example 1. It was confirmed that the obtained sample is $Sb_8O_{11}Br_2$ nanobelts with a uniform size. They may block 80% or more of UV rays in the original state, in the photochromic color-changed state and in the restoring state. Meanwhile, in the photochromic color-changed state, they may block a part of visible light, so as to reduce the light intensity.

Example 8: Preparation of $Bi_2O_3WO_3$ Nanomaterial 0.5 g bismuth nitrate was weighed out and added into a 50 mL three-necked flask filled with 30 mL deionized water, which was then stirred for 5 min by a magnetic stirrer. 0.5 g mannitol was weighed out and added into the above mixed solution, and then the solution was heated to 90° C. by an electric heating jacket. 0.8 g cetyl trimethylammonium bromide was weighed out and added into the above mixed solution, and then the solution was heated and stirred for another 30 min. until the solution was in a transparent state, so as to obtain a first solution.

0.2 g sodium tungstate was weighed out and added into a 10 mL beaker filled with 5 mL deionized water. The mixture was then stirred for 15 min by a magnetic stirrer equipped with an electric heating jacket, until the solution was in a transparent state, so as to obtain a second solution.

The second solution was injected into the first solution by a syringe. After the reaction system was reacted for 240 s in the above-mentioned three-necked flask stirred by the magnetic stirrer and heated by an electric heating jacket, it was cooled to the room temperature in ice-bath.

Once the reaction was completed, the product was washed 3 to 5 times circularly with absolute ethyl alcohol and deionized water in a centrifugal manner (the high speed centrifuge was available from Zonkia, centrifugal speed: 14000 rpm, centrifugal time: 5 min/cycle). Finally, the sample was dried in a drying oven at a constant temperature of 60° C.

The obtained sample was subjected to the same identification, examination and analysis as in the above-mentioned Example 1. It was confirmed that the obtained sample is $Bi_2O_3WO_3$ nanoparticles with a uniform size. They may block 80% or more of UV rays in the original state, in the photochromic color-changed state and in the restoring state. Meanwhile, in the photochromic color-changed state, they may block a part of visible light, so as to reduce the light intensity.

Example 9: Preparation of $SnO_2MoO_3$ Nanomaterial 0.75 g tin tetrachloride was weighed out and added into a 100 mL three-necked flask filled with 30 mL deionized water. The mixture was then stirred for 5 min by a magnetic stirrer. 0.5 g glycerol was weighed out and added into the above mixed solution, and then the solution was heated to 100° C. by an electric heating jacket. 1.0 g sodium dodecyl benzene sulfonate was weighed out and added into the above mixed solution, and then the solution was heated and stirred for another 30 min, until the solution was in a transparent state, so as to obtain a first solution.

1.5 g ammonium molybdate was weighed out and added into a 25 mL beaker filled with 20 mL deionized water. The mixture was then stirred for 15 min by a magnetic stirrer equipped with an electric heating jacket, until the solution was in a transparent state, so as to obtain a second solution.

The second solution was injected into the first solution by a syringe. After the reaction system was reacted for 300 s in the above-mentioned three-necked flask stirred by the magnetic stirrer and heated by an electric heating jacket, it was cooled to the room temperature in ice-bath.

Once the reaction was completed, the product was washed 3 to 5 times circularly with absolute ethyl alcohol and deionized water in a centrifugal manner (the high speed centrifuge was available from Zonkia, centrifugal speed: 14000 rpm, centrifugal time: 5 min/cycle). Finally, the sample was dried in a drying oven at a constant temperature of 60° C.

The obtained sample was subjected to the same identification, examination and analysis as in the above-mentioned Example 1. It was confirmed that the obtained sample is $SnO_2MoO_3$ nanosheets with a uniform size. They may block 80% or more of UV rays in the original state, in the photochromic color-changed state and in the restoring state. Meanwhile, in the photochromic color-changed state, they may block a part of visible light, so as to reduce the light intensity.

In order to further explain the present disclosure, in combination with inorganic photochromic materials prepared in the above-mentioned Examples, their applications are described in details. However, it should be understood that these Application Examples were performed according to the technical solutions of the present disclosure. The embodiments in details and specific operation processes given are only for further explaining the characteristics and advantages of the present disclosure, but not limiting claims of the present disclosure. The protection scope of the present disclosure is not limited to the Examples below, either.

Meanwhile, all raw materials and devices mentioned in the specification were available from the market.

Example 10: Production of Surface-Film-Type Photochromic Transparent Glass Capable of Blocking UV Rays A piece of normal window glass was cut with a glass cutter in order to prepare a rectangular glass sheet with a size of 2.2×3.8 cm. The glass sheet was washed circularly with acetone and absolute ethyl alcohol, until the surface was clean. The cleaned glass sheet was dried in a drying oven at a constant temperature of 60° C. for subsequent use.

1 g $BiBaO_2Br$ nanomaterial prepared in Example 4 was weighed out and added into a 25 mL screw-cap bottle filled with 10 mL absolute ethyl alcohol. Then the mixture was processed under ultrasonic by a ultrasonic device (device model: PS-40A 10 L) with a power of 240 W at a constant temperature of 25° C. for 30 min, so as to obtain a homogeneously-dispersed emulsion.

1 mL of the above-mentioned homogeneously-dispersed emulsion was added dropwise on the above-mentioned cleaned glass sheet, and was spread throughout the glass sheet by a glass rod. When the room temperature was 20° C., it was dried naturally for 30 min, forming a layer of uniform thin film on the surface of the glass sheet, so as to obtain surface-film-type photochromic transparent glass.

Figure 4:
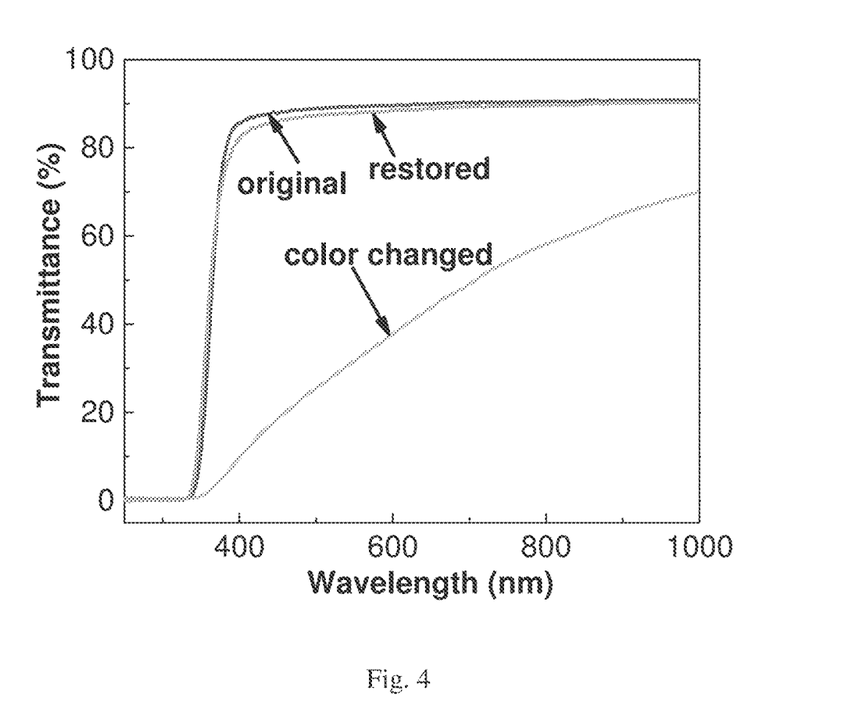
FIG. 4 is a transmittance curve of the photochromic glass prepared according to Example 10 of the present disclosure in different states.

The surface-film-type photochromic transparent glass was examined by a deep UV-VIS-near IR spectrophotometer (model: DUV-3700) for light transmittance. A light transmittance diagram as FIG. 4 was obtained. As can be seen from FIG. 4, the surface-film-type photochromic transparent glass prepared by the inorganic photochromic nanomaterial of the present disclosure may filter off light in the UV wave band in the original state, in the photochromic and in the restoring state. Meanwhile, in the photochromic color-changed state, it may filter off a part of visible light, so as to decrease the light transmittance and reduce the light intensity.

Figure 5:
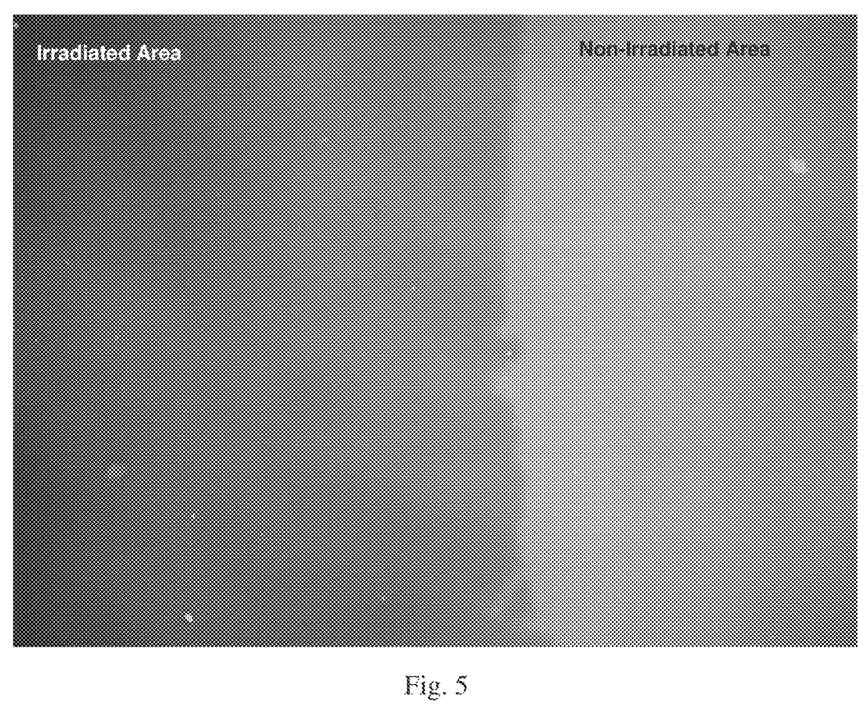
FIG. 5 is an image of optical microscopy of the photochromic glass prepared according to Example 10 of the present disclosure at the boundary between the irradiated area and the non-irradiated area.

FIG. 5 is an image of optical microscopy of the photochromic glass prepared according to the Example 10 of the present disclosure at the boundary between the irradiated area and the non-irradiated area. As can be seen from FIG. 5, the irradiated area represents remarkably dark color, while the non-irradiated area is colorless. The borderline is clear at the boundary.

Example 11: Production of Doped-Type Photochromic Transparent Glass Capable of Blocking UV Rays 0.25 g above-mentioned $Sb_4O_5Cl_2$ nanomaterial prepared in Example 5 and 50 g polycarbonate were weighed out and added into a ball mill (device model: DECO-PBM-V-0.4 L). The mixture was ball milled for 1 h, and uniformly mixed powders were obtained. The uniformly mixed powders mentioned above was pressed by a thin-film hot press (device model: TH-XC601-HC100), forming a compact transparent thin film, so as to prepare a doped-type photochromic transparent glass film.

The obtained doped-type photochromic transparent glass film was subject to the same examination as in the above-mentioned Example 10. A similar result was obtained. That is to say, the doped-type photochromic transparent glass film prepared by using the inorganic photochromic nanomaterial of the present disclosure may filter off light in the UV wave band in the original state, in the photochromic and in the restoring state. Meanwhile, in the photochromic color-changed state, it may filter off a part of visible light, so as to decrease the light transmittance and reduce the light intensity.

Example 12: Production of Self-Supporting-Type Photochromic Transparent Thin Film Capable of Blocking UV Rays A square normal window glass sheet with a size of 10×10 cm was washed circularly with acetone and absolute ethyl alcohol until the surface was clean. The cleaned glass sheet was dried in a drying oven at a constant temperature of 60° C. for subsequent use.

0.1 g above-mentioned $SnO_2MoO_3$ nanomaterial prepared in Example 9 and 5 g polyvinyl butyral (PVB) were weighed out and added into a 25 mL screw-cap bottle filled with 20 mL isopropanol. Then the mixture was processed under ultrasonic by a ultrasonic device with a power of 240 W at a constant temperature of 25° C. for 30 min, so as to obtain a homogeneously-dispersed glue solution.

5 mL above-mentioned homogeneously-dispersed glue solution was added dropwise on the above-mentioned cleaned glass sheet, and was spin-coated by a spin coater (device model: KW-4A Model Spin Coater) at a rotate speed of 800 rpm for 30 s. Then the spin coated glass sheet was transferred to a drying oven at a constant temperature of 60° C. for 60 min, in order to form a layer of uniform transparent thin film on the surface of the glass sheet. The prepared thin film was scraped off from the glass by a knife, so as to obtain a self-supporting-type photochromic transparent thin film.

The obtained self-supporting-type photochromic transparent thin film was subject to the same examination as in the above-mentioned Example 10. A similar result was obtained. That is to say, the self-supporting-type photochromic transparent thin film prepared by using the inorganic photochromic nanomaterial of the present disclosure may filter off light in the UV wave band in the original state, in the photochromic and in the restoring state. Meanwhile, in the photochromic color-changed state, it may filter off a part of visible light, so as to decrease the light transmittance and reduce the light intensity.

As can be known from the above-mentioned Examples, the photochromic nanomaterials prepared according to the present disclosure may block 80% or more of UV rays, in particular, may change to a transparent dark color and reduce the light transmittance under irradiation by strong light, whereas they may restore colorless transparent state without irradiation by strong light.

The above-mentioned explanation to Examples is used for helping to understand the method and the principle of the present disclosure. It should be noted that some changes and modifications may be made to the present disclosure by those person skilled in the art, without departing the principle of the present disclosure. Such changes and modifications are also within the protection scope of claims of the present disclosure.

The invention claimed is:

1. A photochromic nanomaterial capable of blocking ultraviolet rays with a general formula of $M_aO_bX_c$, wherein M represents a combination of one selected from the group consisting of tin, indium, antimony, and bismuth with one or more selected from the group consisting of titanium, barium, nickel, vanadium, zinc, and copper; O represents an oxygen atom; X represents one or more selected from the group consisting of a tungstate radical moiety, a molybdate radical moiety, a vanadate radical moiety, fluorine, chlorine, bromine, iodine, sulfur, carbon, phosphorus, and boron that form a compound with the $(M_aO_b)$ moiety in the general formula; and the molar ratio of a:b:c is (1~50):(1~50): 1.

2. The photochromic nanomaterial according to claim 1, wherein the molar ratio of a:b:c is (1~20):(1~30): 1.

3. The photochromic nanomaterial according to claim 1, wherein the morphology of the nanomaterial is one or more selected from the group consisting of quantum dots, nanowires, nanosheets, nanobelts, and nanoparticles.

4. A method for producing a photochromic nanomaterial capable of blocking ultraviolet rays with a general formula of $M_aO_bX_c$, wherein M represents a combination of one selected from the group consisting of tin, indium, antimony, and bismuth with one or more selected from the group consisting of barium, nickel, vanadium, zinc, and copper; O represents an oxygen atom; X represents one or more selected from the group consisting of a tungstate radical moiety, a molybdate radical moiety, a vanadate radical moiety, fluorine, chlorine, bromine, iodine sulfur, carbon, phosphorus, and boron that form a compound with the $(M_aO_b)$ moiety in the general formula and the molar ratio a:b:c is (1~50):(1~50): 1, the method comprises following steps:
A) heating a mixture of an M-containing cation source compound, a polyol, a surfactant and first solvent under agitation, to obtain a hot first solution;
B) mixing an X-containing anion source compound and a second solvent, to obtain a second solution;
C) injecting the second solution into the hot first solution, to perform a reaction and obtain a reaction mixture; and
D) subjecting the reaction mixture to cooling, separation, washing and/or drying, to obtain the photochromic nanomaterial.

5. The method according to claim 4, wherein
the polyol is one or more selected from the group consisting of oleyl alcohol, glycerol, pentaerythritol, xylitol, mannitol, and sorbitol;
the surfactant is one or more selected from the group consisting of sodium dodecyl benzene sulfonate, cetyl trimethylammonium bromide, disodium edetate, polyvinyl pyrrolidone, lauroyl glutamic acid, sodium stearyl sulfate, and fatty alcohol-polyoxyethylene ether sulfate sodium; and
the first solvent and the second solvent are, independently to each other, one or more selected from the group consisting of $C_{1-6}$ alkanol, deionized water, oleyl amine, cyclohexane, and oleic acid.

6. The method according to claim 4, wherein
the polyol and the M-containing cation source compound have a mass ratio of (1~1500):15;
the surfactant and the M-containing cation source compound have a mass ratio of (1~2000):20;
the first solvent and the M-containing cation source compound have a mass ratio of (1~2000):10; and
the second solvent and the X-containing anion source compound have a mass ratio of (1~1500):10.

7. The method according to claim 4, wherein the hot first solution has a temperature between 30° C. and 300° C.

8. The method according to claim 4, wherein the time period for injecting the second solution into the hot first solution is from 1 s to 12 h.

9. The method according to claim 4, wherein the separation is centrifugal separation; and the drying is performed at a temperature between −50° C. and 150° C. and for a period between 1 h to 72 h.

10. Use of the photochromic nanomaterial according to claim 1 in window glass of buildings, lens of color-changing glasses, window glass of vehicles, information-storing materials, decorative materials, or light sensitive materials.

11. Use of the photochromic nanomaterial prepared by the method according to claim 4 in window glass of buildings, lens of color-changing glasses, window glass of vehicles, information-storing materials, decorative materials, or light sensitive materials.

* * * * *